No. 833,981. PATENTED OCT. 23, 1906.
C. S. SCOTT.
DETACHABLE PNEUMATIC TIRE.
APPLICATION FILED OCT. 30, 1905.
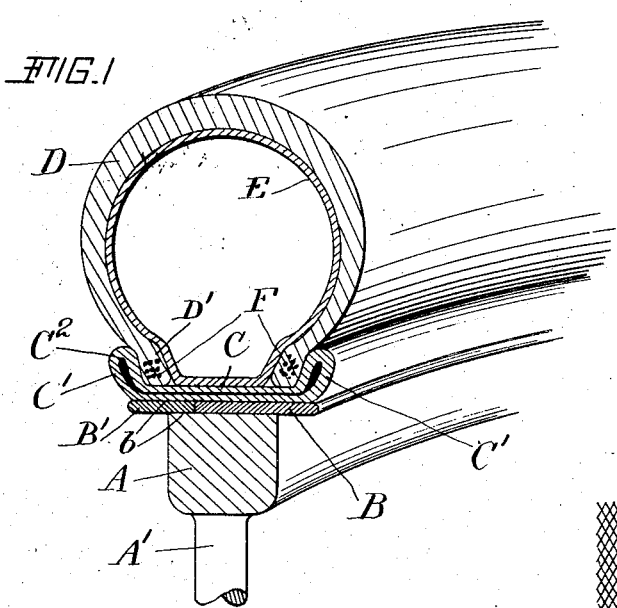
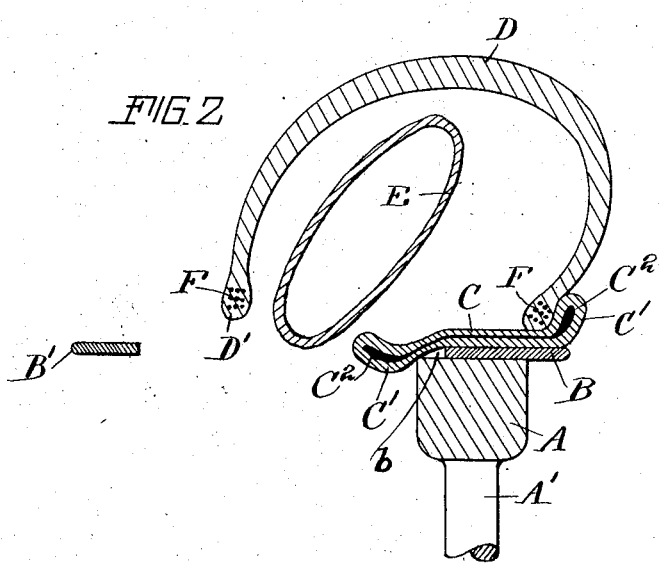
Witnesses
Ivan Koenigsberg.
F. T. Chapman.
Charles S. Scott Inventor
By his Attorneys
Lyons & Bissing

UNITED STATES PATENT OFFICE.

CHARLES S. SCOTT, OF CADIZ, OHIO.

DETACHABLE PNEUMATIC TIRE.

No. 833,981.  Specification of Letters Patent.  Patented Oct. 23, 1906.

Application filed October 30, 1905. Serial No. 285,059.

*To all whom it may concern:*

Be it known that I, CHARLES S. SCOTT, a citizen of the United States, and a resident of Cadiz, Harrison county, Ohio, have invented a new and useful Improvement in Detachable Pneumatic Tires, of which the following is a specification.

The object of my invention is to produce a pneumatic tire for heavy vehicles which shall be automatically detachable upon deflation of the tire, and this in the simplest possible manner and without any unnecessary manipulation; which shall be easy of manufacture, and more especially with the existing tools and appliances of rubber-factories, and which shall be free from the chafing which is common in other types of tires by reason of the relative motion between the tire-shoe and the adjacent and contacting rigid parts.

To this end my invention comprises a tire-shoe having an inextensible selvage, a flexible bolster having a side flange coöperating with and holding the endless selvage in place, and a supporting piece or ring which lies beneath the bolster when the tire is inflated, and thus holds the bolster-flange in position to restrain a lateral displacement of the shoe-selvage, and which when the tire is deflated may be readily removed to permit the bolster to flex downwardly, and thereby remove the bolster-flange from restraining proximity to the shoe-selvage.

In the drawings, Figure 1 is a perspective view of a portion of a wheel-rim carrying my tire when inflated and attached, the end being shown in section. Fig. 2 is a similar view when the tire is deflated and detached, and Fig. 3 is a detail of wire tape which I may employ.

In the drawings I have shown as one type of tire embodying my invention a wheel having a common type of spokes A′ and wood felly A, shrunk upon which is a plain annular wheel-rim B. In the present embodiment of my invention I have shown this rim B as extending but part way across the felly, so as to leave a cut-away portion or groove $b$ on the side of the felly not covered by the rim B. Into this cut-away portion $b$ fits a supporting-piece in the shape of a ring B′.

The bolster, which I generally build of canvas and rubber, is composed of a flexible base C and side flanges C′, having a rubber filling $C^2$. While these side flanges must possess the rigidity necessary to withstand the outward pressure of the inflated tire, they are preferably of a sufficiently-yielding character to cause a soft fit between their inner faces and the outer faces of the tire-shoe.

The tire-shoe D is of the usual construction and is supplied with inextensible selvages D′, which may be made by incorporating therein a ring of wire or several convolutions of the wire braid or tape F. (Shown in Fig. 3.) The inner tube E has the usual valve for inflation, which I have considered it unnecessary to illustrate, and although I have shown the inner tube as separate from the outer shoe, as in double-tube tires, it is well understood that these parts may be permanently secured, as in single-tube tires.

The operation of my invention will be clear at a glance. When the inner tube has been attached and inflated, the inextensible selvages of the tire-shoe press against the side flanges of the bolster, causing these to bend outwardly to the limit of their stretch and to rock upon their point of contact with the wheel-rim as a fulcrum. This brings into play a force which acts radially inward toward the wheel center, and thus holds the supporting-piece in place. So long as the inner tube remains inflated the parts maintain the positions shown in Fig. 1. What is more, the close and soft fit between the outer faces of the tire-shoe, which is composed of canvas and rubber, and the inner faces of the side flanges of the bolster, which may be built of the same materials, prevents any chafing of the parts which is now such a prolific source of wear and of tire destruction.

When it is sought to detach the tire, the inner tube is deflated. This removes the radially-inward pressure against the supporting-piece B′, and a kick or blow against the wheel is sufficient to dislodge the supporting-ring from its place in the cut-away portion $b$, whereupon the bolster may be flexed downwardly sufficiently to permit the instant removal of the tire-shoe.

It is manifest that a construction of a wheel-rim suitable for my tire may be attained in many ways which differ from that shown herein by way of example. At the same time it is to be observed that in the construction shown the rim B extends part way across the face of the felly, and the juxtaposed removable filling-piece B′ of itself completes the wheel-rim. Furthermore, it is to be especially noted that in the illustrated construction the supporting-piece and the flanges of the bolster extend laterally beyond the face of the felly. When, then, the supporting-piece has been removed, the bolster can flex downwardly toward the wheel center by a distance much greater than the depth of the cut-away portion $b$.

It is also evident that it is unnecessary to make the supporting-piece as a complete ring, since a segment of a ring extending part way round the circumference will when removed permit the bolster-flange to flex downwardly for a sufficient extent, measured angularly around the wheel, to remove the tire-shoe. Since the tire need only be removed from one side, it is clear that the side of the bolster opposite thereto may be permanently attached to the wheel-rim B. On the other hand, both the parts B' and B might be removable.

I may state in conclusion that there is no part of this tire which may not readily be manufactured in a rubber works. The rim B and supporting-piece B' are capable of being rolled by the simplest tools. The flexible bolster may be built up of rubber and canvas and vulcanized on a form in a manner which will be obvious to any rubber manufacturer. It follows that any rubber-factory can build all the parts of my tire.

I claim—

1. A wheel-rim provided with a flexible bolster having a side flange, and a removable supporting-piece beneath the bolster, substantially as described.

2. A detachable and inflatable pneumatic tire comprising a tire-shoe having an inextensible selvage, a flexible bolster having a side flange coöperating therewith, and a removable supporting-piece beneath the bolster, substantially as described.

3. A detachable and inflatable pneumatic tire comprising a tire-shoe having an inextensible selvage built up of wire tape, a flexible bolster having a side flange coöperating therewith, and a removable supporting-piece beneath the bolster, substantially as described.

4. A wheel-rim having a flexible bolster with a side flange, and a removable supporting-piece lying in a cut-away portion of the wheel-rim beneath the bolster, substantially as described.

5. A detachable, inflatable pneumatic tire comprising a felly having an annular rim extending part way across its face, a juxtaposed removable supporting-piece extending beyond the rim-face, and a flexible bolster having a side flange lying over the supporting-piece, substantially as described.

6. A detachable inflatable pneumatic tire comprising a felly having an annular rim extending part way across its face, a juxtaposed removable supporting-piece extending beyond the rim-face, a flexible bolster having a side flange lying over the supporting-piece, and a tire-shoe having an inextensible selvage coöperating with the flange, substantially as described.

In testimony whereof I have signed my name to this specification in the presence of two subscribing witnesses.

CHAS. S. SCOTT.

Witnesses:
ELMER DOWNARD,
VANA McMAHAN.